Patented Oct. 10, 1950

2,525,672

UNITED STATES PATENT OFFICE 2,525,672

PREPARATION OF ALKYNYL-ALKENYLCARBINOLS

Ian Morris Heilbron and Ewart Ray Herbert Jones, London, England

No Drawing. Application September 9, 1948, Serial No. 48,533. In Great Britain September 26, 1947

5 Claims. (Cl. 260—632)

This invention relates to the preparation of alkynyl-alkenylcarbinols. The synthesis of carbinols of this type has hitherto been difficult, a poor overall yield of the desired carbinols being usually obtained. It is one object of the present invention therefore to provide a simple and efficient process for the synthesis of compounds of the said type.

According to the present invention the process for the preparation of alkynyl-alkenylcarbinols comprises reacting a chloro- or bromo-epoxy alkane of the formula:

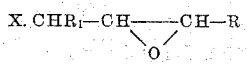

wherein X is Cl or Br, and R and $R_1$ are hydrogen or a methyl or ethyl group, in liquid ammonia with an alkali metal derivative of an alkynyl hydrocarbon of the formula $Y-C \equiv CM$ in which Y represents hydrogen or an alkyl or aryl group, and M is an alkali metal.

The reaction proceeds thus:

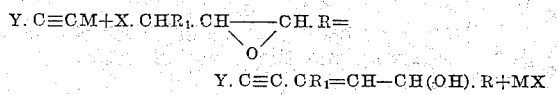

The process of the invention may be carried out by adding the haloepoxy compound to the alkali metal derivative of the alkynyl hydrocarbon in solution in liquid ammonia. In the preferred mode of operation, a molar excess of the alkali metal derivative of the alkynyl hydrocarbon is used.

The reaction time employed may vary within wide limits, reaction times of from 5 to 18 hours having been found satisfactory. In the preparation of certain carbinols the reaction terminates in a comparatively short time whereas in the preparation of other carbinols much longer reaction times have to be employed. The reaction is preferably carried out at the boiling point of the reaction medium, but temperatures above or below that temperature may also be used. In some cases it is found beneficial to cool the reaction mixture strongly, for example, by means of solid carbon dioxide in an organic solvent.

The reaction may if desired be carried out in an atmosphere of an inert gas such as nitrogen.

In carrying out the reaction the alkali metal derivative of the alkynyl hydrocarbon is preferably formed in the reactor before the reaction by mixing the alkynyl hydrocarbon and alkali metal such as sodium or potassium in solution in liquid ammonia in the reactor, if desired in the presence of a ferric catalyst which catalyses the formation of for instance sodamide. The haloepoxy alkane is then added under stirring, and if necessary with cooling after the formation of the alkali metal derivative of the alkynyl hydrocarbon. Although this process will normally be carried out as a batch process, it may also be carried out as a continuous process.

The carbinol produced in the reaction may be separated from the reaction mixture by any suitable method, for example, solvent extraction or distillation or a combination of these steps. Excess ammonia and of the alkali metal derivatives of the alkynyl hydrocarbon present in the reaction product are removed or decomposed first.

Alkynyl hydrocarbons which are particularly suitable for the process of the present invention include acetylene, phenyl acetylene and 1-hexyne, and suitable haloepoxy alkanes include epichlorohydrin, epibromohydrin and bromo-2:3-epoxybutane.

The following examples illustrate the process of the present invention. The light absorption data referred to were determined in alcohol solution.

Example 1

To a solution of sodium acetylide in liquid ammonia (7 litres), prepared by the saturation with acetylene of a solution obtained by dissolving 276 grams of sodium in 7 litres of liquid ammonia using the ferric nitrate catalyst of Vaughan, Vogt, Nieuwland (J. Amer. Chem. Soc. 1934, 56, 2120) to catalyse the formation of sodamide, 555 grams of epichlorohydrin were run in during 2 hours with stirring and cooling by alcohol-solid carbon dioxide mixture. Nitrogen was introduced during the addition and during the subsequent 16 hours stirring after which 660 grams of ammonium chloride were added during 2½ hours and the ammonia evaporated on the steam bath. 3 litres of ether were added and the solid residue obtained on filtering was dissolved in water. A small quantity of tar was removed by filtration, the solution was extracted thoroughly with ether, the combined ethereal solutions washed with dilute sulphuric acid and water and then dried. Evaporation of the solvent and distillation gave 201 grams of pent-2-en-4-yn-1-ol.

Example 2

The method described in Example 1 was repeated using 137 grams of epibromohydrin and 46 grams of sodium acetylide in 1.2 litres of liquid ammonia. There were obtained (1) 21 grams of pent-2-en-4-yn-1-ol, and (2) 10.6 grams of a colourless liquid having B. P., 74–75°/1.5 mm.
$n_D^{22°}$, 1.4831
Light absorption:
 Maximum, 2230 A.
  $\epsilon$, 16,000
 Inflexion, 2310 A.
  $\epsilon$, 12,500

Analysis gave C, 66.75%, 66.4%; H, 6.7%. $C_{10}H_{12}O_3$ requires C, 66.65%; H, 6.7%.

The structure of this product has not yet been ascertained.

*Example 3*

The method described in Example 1 was repeated using 77.5 grams of 1-bromo-2:3-epoxybutane (Delaby, Compt. rend. 1923, 176, 589) and 24 grams of sodium acetylide in 600 cc. of liquid ammonia. This gave 21.3 grams of hex-3-en-5-yn-2-ol.

As a by-product in this example there was obtained 7.5 grams of a substance believed to be 2-(2:3-epoxy-1-butoxy)-hex-3-en-5-yne, a colourless pleasant smelling liquid, slowly turning yellow in air, having:

B. P., 122–124°/32 mm., 66–67°/0.5 mm.
$n_D^{18°}$, 1.4745
Light absorption:
 Maximum, 2230 A.
  $\epsilon$, 13,500
 Inflexion, 2280 A.
  $\epsilon$, 12,500

Analysis gave C, 71.85%; H, 8.6%; $C_{10}H_{14}O_2$ requires C, 72.25%; H, 8.5%.

*Example 4*

To sodamide, prepared from 7.7 grams of sodium in 400 cc. of liquid ammonia as described above, 35 grams of phenylacetylene were added during 15 minutes. After stirring for 1 hour, 30.6 grams of epichlorohydrin were run in during 15 minutes; the solution was stirred for a further 16 hours and was then worked up in the manner described in Example 1. Distillation gave, besides some unchanged starting material, two fractions:

(1) 1.6 grams having:
B. P., 70–72°/1. mm.
$n_D^{16°}$, 1.5459

(2) 5-phenylpent-2-en-4-yn-1-ol (5.8 g.) as a pale yellow oil turning dark yellow on keeping, having:

B. P., 94–96°/10⁻³ mm.
$n_D^{24°}$, 1.6173
Light absorption:
 Maximum, 2590, 2720, 2890 A.
  $\epsilon$, 19,000, 26,000 and 21,000 respectively.

*Example 5*

90 grams of 1-hexyne were caused to react with sodamide, made from 23.5 grams of sodium in 1 litre of liquid ammonia, as previously described, but instead of being cooled, the reaction flask was well lagged with cork dust. 80 grams of epichlorohydrin were dropped in during 1 hour, then the solution was stirred for 42 hours without cooling, the volume being kept constant by adding more liquid ammonia occasionally. On working up in the manner described in Example 1, distilling off unchanged starting materials and carefully fractionating the residue, there was obtained 24 grams of non-2-en-4-yn-1-ol as a pleasant smelling colourless oil, having:

B. P., 67°/0.1 mm.
$n_D^{20°}$, 1.4920
Light absorption:
 Maximum, 2280, 2370 A.
  $\epsilon$, 14,000 and 12,000 respectively.

The products obtained by the process of the present invention are suitable as starting materials in the synthesis of many valuable chemical products.

For example, they may be partially or completely hydrogenated, for example with the production of a dienol, if desired in the presence of a palladium or other hydrogenation catalyst; treated with mercury sulphate and sulphuric acid to produce a furane derivative; treated with an amine and formaldehyde to effect the Mannich reaction; oxidised, for example, by means of chromic acid in acetone to give the corresponding carboxylic acid; subjected to oxidative coupling in the presence of cuprous ammonium chloride to give the corresponding di-yne-glycol, which may be hydrogenated to the corresponding alkane diol; or condensed with formaldehyde in the presence of a cuprous hydroxide catalyst.

We claim:

1. Process for the preparation of alkynyl alkenyl carbinols which comprises reacting a halogen epoxy alkane of the general formula

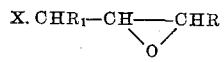

where X stands for a halogen selected from the group consisting of chlorine and bromine, and R and $R_1$ represent a substituent selected from the group consisting of hydrogen, methyl and ethyl, in liquid ammonia with an alkali metal derivative of an alkynyl hydrocarbon of the general formula Y.C≡CM in which Y stands for a substituent selected from the group consisting of hydrogen, alkyl and aryl and M is an alkali metal.

2. Process according to claim 1 which comprises carrying out the reaction in an inert atmosphere.

3. Process according to claim 1 wherein the reaction is carried out at the boiling point of the liquid ammonia.

4. Process according to claim 1 wherein a molar excess of the alkali metal derivative of the alkynyl hydrocarbon over the halogen epoxy alkane is used.

5. Process for the production of pentenynol which comprises reacting epichlorohydrin with alkali metal acetylide dissolved in liquid ammonia.

IAN MORRIS HEILBRON.
EWART RAY HERBERT JONES.

REFERENCES CITED

The following references are of record in the file of this patent:

UNITED STATES PATENTS

| Number | Name | Date |
|---|---|---|
| 2,125,384 | Macallum | Aug. 2, 1938 |
| 2,425,201 | Oroshnik | Aug. 5, 1947 |

FOREIGN PATENTS

| Number | Country | Date |
|---|---|---|
| 560,081 | Great Britain | Mar. 20, 1944 |

OTHER REFERENCES

Johnson: "Acetylenic Compounds," vol. 1, page 7, Pub. by Edw. Arnold Co., London, 1946.